Feb. 25, 1941.                K. T. PENICK                2,233,030
                              PUMP PLUNGER
                          Filed July 15, 1938
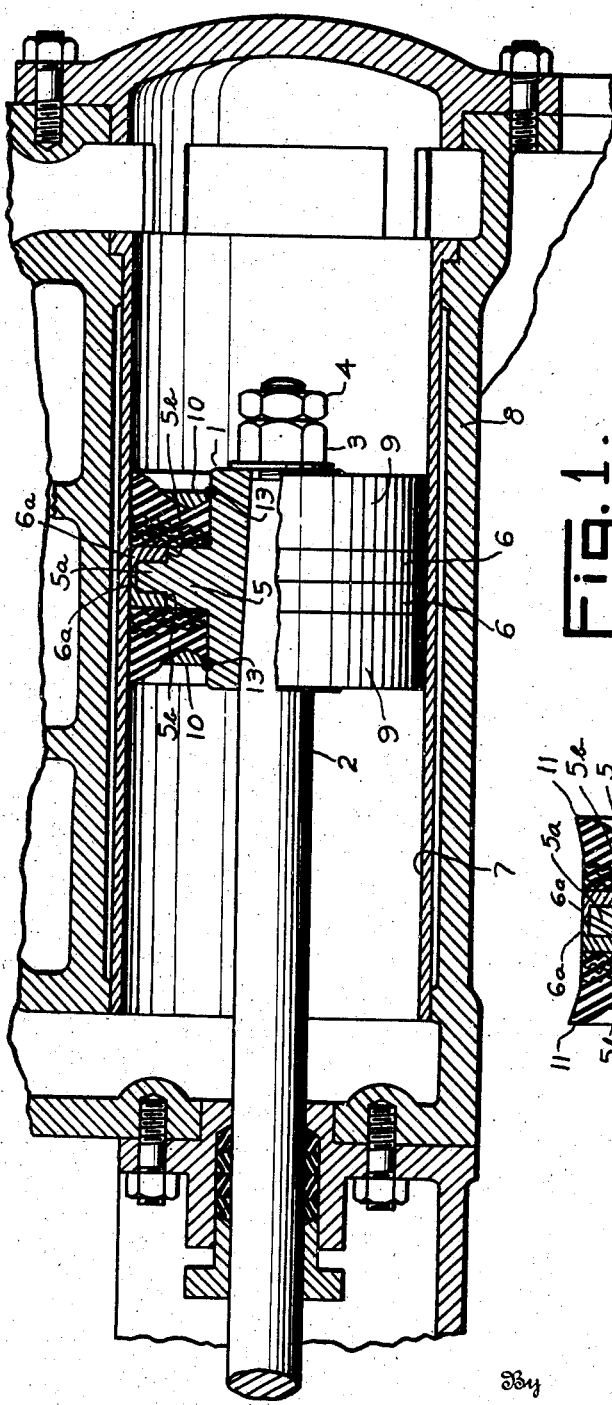
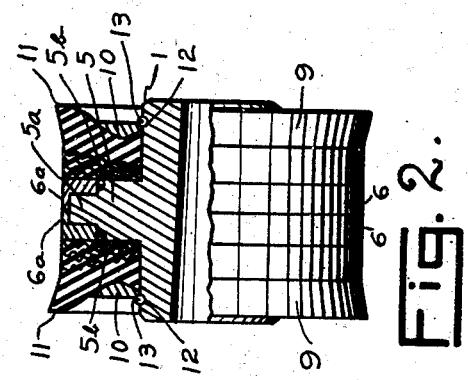
Inventor
Kirby T. Penick
By
Edward V. Hardway
Attorney.

Patented Feb. 25, 1941

2,233,030

UNITED STATES PATENT OFFICE 2,233,030

PUMP PLUNGER

Kirby T. Penick, Houston, Tex., assignor of one-half to Arthur J. Penick, Harris County, Tex.

Application July 15, 1938, Serial No. 219,338

2 Claims. (Cl. 309—4)

This invention relates to a pump plunger.

It is an object of the invention to provide a plunger of the character described specially designed for use in high pressure pumps, such as slush pumps, for handling heavy drilling fluid, or drilling mud, as it is commonly called, containing gritty substances.

It is a further object of the invention to provide a pump plunger of the character described that will form a close fit with the cylinder liner of the pump to prevent leakage of the fluid being pumped past the plunger.

It is a still further object of the invention to provide a plunger having a central body with the parts, which are subject to wear, assembled thereon in such manner that they may be readily removed and replaced with new ones thus dispensing with the necessity of often replacing the body.

It is another object of the invention to provide a pump plunger or piston having removable packing rings, or seal rings mounted thereon with novel means for securing said packing rings in place.

With the above and other objects in view the invention has particular relation to certain novel features of construction, arrangement of parts and use, an example of which is given in this specification and illustrated in the accompanying drawing, wherein:

Figure 1 shows a side view of the plunger, partly in section, located in the pump cylinder, and Figure 2 shows a side view of the plunger, partly in section, as detached from the pump assembly.

Referring now more particularly to the drawing wherein like numerals of reference designate the same parts in each of the figures, the numeral 1 designates the plunger body having a tapering bore axially therethrough to receive the tapered end of the plunger rod 2. The plunger may be secured on said rod by means of the nut 3 and the lock nut 4 which are screwed on to the externally threaded end of the rod in a conventional manner and as shown in Figure 1.

The body 1 has an external, annular flange 5 therearound located approximately midway between the ends of the body and whose outer margin 5a is reduced in thickness forming the external, annular shoulders 5b, 5b. Around the reduced portion 5a are the protecting rings 6, 6 whose inner margins abut the corresponding shoulders 5b and whose outer margins have the inwardly turned flanges 6a, 6a which overlap the periphery of the reduced portion 5a and which abut. These rings 6 are preferably formed of relatively soft material so as not to injure the liner 7, of the pump cylinder 8, in which the plunger works.

Fitted around the ends of the body 1 and in abutting relation with the flange 5 and the rings 6 are the annular seal rings or packing rings 9, 9. These packing rings are preferably formed of rubber or similar yieldable material suitably re-enforced with fabric or similar re-enforcing material as shown. Their outer ends are formed with annular grooves forming seats for the clamp rings 10, 10 preferably formed of metal or similar rigid material. The inner surfaces of the clamp rings 10 are shaped to conform to the shape of and to fit closely in said grooves. The outer ends of the packing rings terminate in annular lips 11 which are slightly flared outwardly as shown in Figure 2 and which are of a greater transverse diameter than the transverse diameter of the liner 7 so that they will be compressed into alignment with the outer surfaces of the rings 6 when the plunger is inserted into the cylinder liner, as shown in Figure 1, so that the lips will form a close fit with the liner all the way around. Upon compression stroke of the plunger the advancing lip 11 will be expanded by the pressure of the fluid into close fitting contact with the liner and the trailing lip 11 will slightly relax thus reducing the frictional wear on the trailing lip while the plunger is working.

The ends of the body have the external, annular grooves 12, 12 to receive the open lock rings 13, 13 which may be snapped therein to lock the corresponding rings 10 in place to hold said rings 10 pressing closely against the packing rings 9.

In case a part should become worn to require replacement the corresponding ring 13 may be readily removed to permit the easy removal and replacement of the worn part. The only parts which will be subjected to any considerable wear will be the surrounding rings 6 and the packing rings 9.

The drawing and description disclose what is now considered to be a preferred form of the invention by way of illustration only, while the broad principle of the invention will be defined by the appended claims.

What I claim is:

1. A plunger comprising a cylindrical body and having external, annular end grooves, an annular flange around the body intermediate the ends thereof, the outer margin of said flange being reduced in thickness on each side forming outwardly facing, abrupt, annular shoulders around the flange, protecting rings around the reduced portion of the flange whose inner margins abut the corresponding shoulders and whose outer margins have the inwardly turned flanges which overlap the periphery of said reduced portion and which abut, said protecting rings being formed of soft material, annular seal rings fitted around the ends of said body and in abutting relation with the intermediate flange and protecting rings, said seal rings being formed of resilient material with their outer ends provided with annular grooves forming seats, clamp rings formed of rigid material conforming in shape to and fitting into said seats, snap lock rings fitted into said grooves and bearing against the clamp rings and constantly pressing the clamp rings closely against the seal rings.

2. A plunger comprising a cylindrical body and having external, annular end grooves, an annular flange around the body intermediate the ends thereof, the outer margin of said flange being reduced in thickness on each side forming outwardly facing, abrupt, annular shoulders around the flange, protecting rings around the reduced portion of the flange whose inner margins abut the corresponding shoulders and whose outer margins have the inwardly turned flanges which overlap the periphery of said reduced portion and which abut, said protecting rings being formed of soft material, annular seal rings fitted around the ends of said body and in abutting relation with the intermediate flange and protecting rings, said seal rings being formed of resilient material with reinforcing fabric embedded in the packing adjacent the protecting rings and with their outer ends provided with annular grooves forming seats, clamp rings formed of rigid material conforming in shape to and fitting into said seats, snap lock rings fitted into said grooves and bearing against the clamp rings and constantly pressing the clamp rings closely against the seal rings.

KIRBY T. PENICK.